Patented Dec. 24, 1935

2,025,169

UNITED STATES PATENT OFFICE 2,025,169

2-AMINOANTHRAQUINONE - SULPHONIC ACIDS AND A PROCESS OF PREPARING THEM

Georg Kränzlein and Martin Corell, Frankfort-on-the-Main, and Wilhelm Schaich, Bad Soden-on-the-Taunus, Germany, assignors to General Aniline Works, Inc., New York, N. Y., a corporation of Delaware No Drawing. Application November 16, 1934, Serial No. 753,404. In Germany April 1, 1933

7 Claims. (Cl. 260—60)

The present invention relates to 2-aminoanthraquinone-sulphonic acids, particularly to 2-aminoanthraquinone-disulphonic acid and 1,3-dibromo-2-aminoanthraquinone-mono-sulphonic acid and the alkali metal salts thereof, and to a process of preparing them.

We have found that 2-aminoanthraquinone may be very easily disulphonated by heating it to an elevated temperature with sulphuric acid containing sulphuric anhydride. The mixture is preferably heated until a test sample taken therefrom, poured into water and treated at an elevated temperature with an excess of bromine, remains dissolved and forms no longer any quantity of insoluble dibromo-aminoanthraquinone. It is advantageous to control in this manner the exact duration of the sulphonation process for, if the product is heated too long, it decomposes while assuming a dark coloration while, if the duration of heating is too short, the disulphonation is incomplete. It is surprising that under the conditions used for the disulphonation no hydroxy groups enter the molecule and an extensive decomposition does not take place. The aminoanthraquinone-disulphonic acid thus obtained has probably the following constitution:

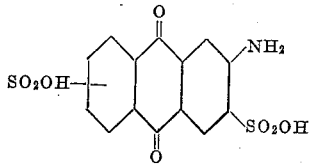

wherein the sulphonic acid group in the amino-free nucleus probably stands in 6- or 7-position or is possibly a mixture of the 6- and 7-sulphonic acids.

The new disulphonic acid is a valuable intermediate product for the manufacture of dyestuffs.

We have furthermore found that the 2-amino-anthraquinone-disulphonic acid thus obtainable may be transformed by bromination into a 1,3-dibromo-2-aminoanthraquinone-mono-sulphonic acid of the following probable constitution:

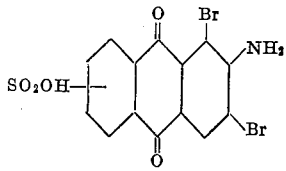

wherein the sulphonic acid group in the amino-free nucleus probably occupies the same position as in the above case. The sulphonic acid thus obtainable has hitherto not been known. It may be used as starting material for the manufacture of new dyestuffs.

The following examples serve to illustrate the invention but they are not intended to limit it thereto, the parts being by weight:

(1) 50 parts of 2-aminoanthraquinone are introduced by portions, while stirring, into 225 parts of sulphuric acid containing 40% of sulphuric anhydride; the mixture is heated at a temperature of about 145° C. to about 150° C. until a test sample, dissolved in water and treated with bromine, does no longer yield a water-insoluble precipitate on addition of bromine. The mixture is then allowed to cool, poured on ice and, if necessary, filtered. From the solution thus obtained the free sulphonic acid may be separated by evaporation in a vacuum in the form of a very readily soluble substance, or the dissolved sulphonic acid is salted out, preferably with potassium chloride.

The di-potassium salt of aminoanthraquinone-disulphonic acid thus obtained, is a yellow powder, readily soluble in water. When treated with nitrite and acid it yields a diazo compound which forms a red dyestuff with 2-naphthol.

(2) 46 parts of the 2-aminoanthraquinone-disulphonic acid obtainable according to the preceding example are dissolved in 400 parts of water; 35 parts of bromine are added thereto by portions and the mixture is stirred for about 2 hours at a temperature of about 40° C. to about 50° C. By addition of potassium chloride the bromination product is salted out, filtered with suction, washed with a dilute solution of potassium chloride and dried. It is readily soluble in water, may be diazotized with acid and nitrite and forms with 2-naphthol a bluish-red dyestuff.

We claim:

1. The process which comprises heating 2-amino-anthraquinone with suphuric acid containing sulphuric anhydride until a test sample taken from the reaction mixture, poured into water and treated at an elevated temperature with an excess of bromine, remains dissolved.

2. The process which comprises heating at a temperature of about 145° C. to about 150° C. a mixture of 2-amino-anthraquinone with sulphuric acid containing 40% of sulphuric anhydride until a test portion of the reaction product after being dissolved in water and mixed with bromine remains dissolved.

3. The process which comprises heating 2-amino-anthraquinone with sulphuric acid containing sulphuric anhydride until a test sample taken from the reaction mixture, poured into water and treated at an elevated temperature with an excess of bromine, remains dissolved, dissolving the 2-amino-anthraquinone disulphonic acid, thus obtained, in water and reacting it with bromine.

4. The process which comprises heating at a temperature of about 145° C. to about 150° C. a mixture of 2-amino-anthraquinone with sulphuric acid containing 40% of sulphuric anhydride, until a test portion of the reaction product after being dissolved in water and mixed with bromine remains dissolved, dissolving the 2-amino-anthraquinone disulphonic acid, thus obtained, in water and reacting it with bromine at about 40° C. to about 50° C.

5. The compounds of the general formula:

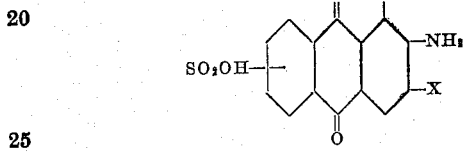

and the alkali metal salts thereof, wherein the sulphonic acid group in the aminofree nucleus probably stands in 6- or 7-position, wherein X stands for a sulpho-group and Y for hydrogen or wherein X and Y stand for bromine, being soluble in water and yielding in known manner a diazo-compound which forms a reddish dyestuff with 2-naphthol.

6. The compound of the formula:

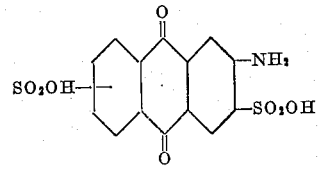

and the alkali metal salts thereof wherein the sulphonic acid group in the aminofree nucleus probably stands in 6- or 7-position, being soluble in water and yielding in known manner a diazo-compound which forms a reddish dyestuff with 2-naphthol.

7. The compound of the formula:

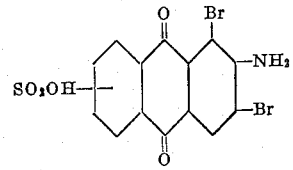

and the alkali metal salts thereof, wherein the sulphonic acid group in the aminofree nucleus probably stands in 6- or 7-position, being soluble in water and yielding in known manner a diazo-compound which forms a reddish dyestuff with 2-naphthol.

GEORG KRÄNZLEIN.
MARTIN CORELL.
WILHELM SCHAICH.